T. R. DU BOIS.
ENGINE STARTER AND GENERATOR.
APPLICATION FILED MAR. 4, 1915.
1,288,847.
Patented Dec. 24, 1918.
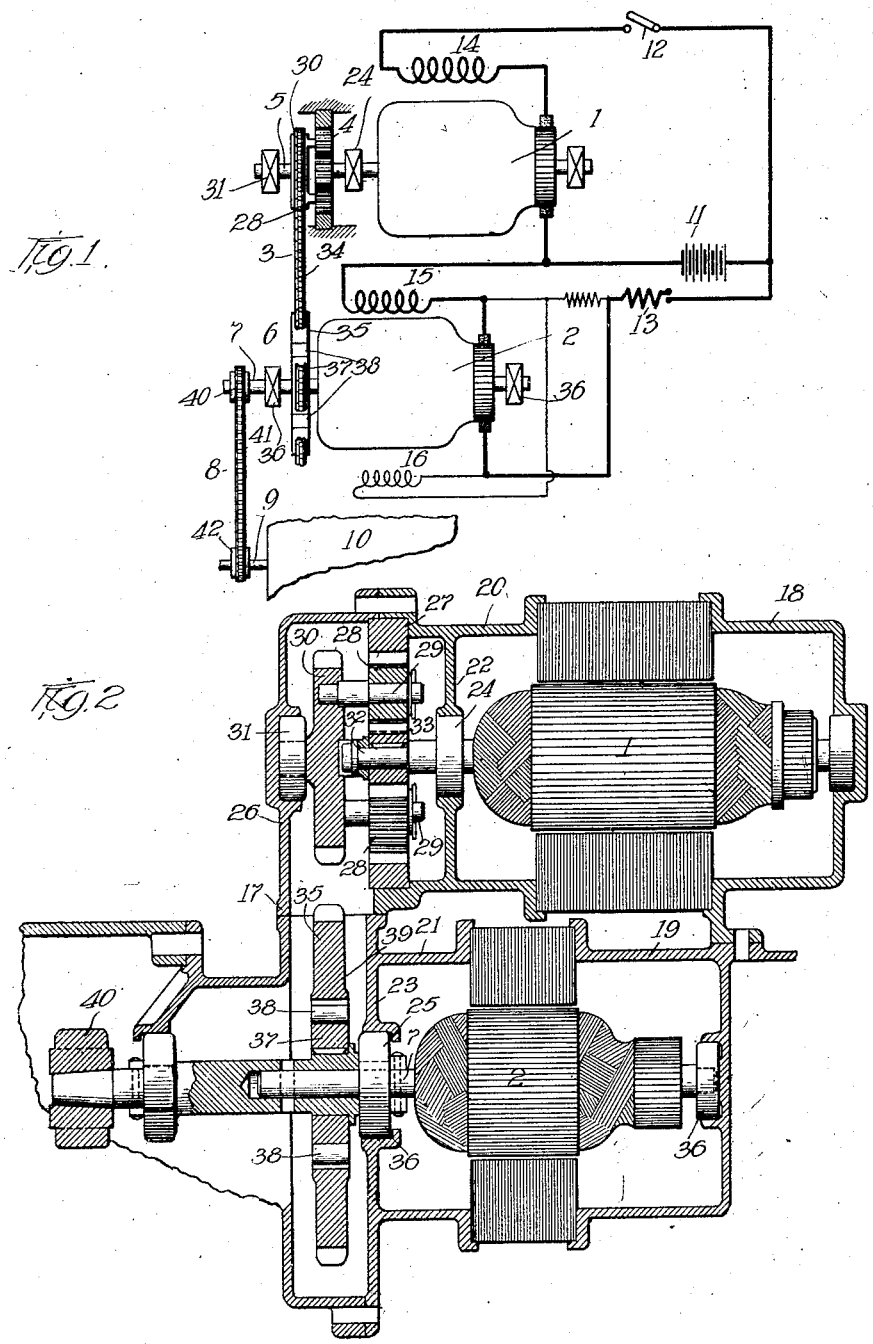

UNITED STATES PATENT OFFICE.

THOMAS R. DU BOIS, OF NIAGARA FALLS, NEW YORK, ASSIGNOR, BY MESNE ASSIGN-MENTS, TO U. S. LIGHT & HEAT CORPORATION, OF NIAGARA FALLS, NEW YORK, A CORPORATION OF NEW YORK.

ENGINE-STARTER AND GENERATOR.

1,288,847.  Specification of Letters Patent.  Patented Dec. 24, 1918.

Application filed March 4, 1915. Serial No. 11,978.

*To all whom it may concern:*

Be it known that I, THOMAS R. DU BOIS, a citizen of the United States, residing at Niagara Falls, in the county of Niagara and State of New York, have invented new and useful Improvements in Engine-Starters and Generators, of which the following is a full, clear, concise, and exact description, reference being had to the accompanying drawing, forming a part of this specification.

This invention relates to engine starters and generators and with regard to certain more specific features thereof, to engine starters and generators having mechanical power transmitting devices between the dynamo-electric machine or machines and the engine.

It is one of the objects of the invention to provide a starting and generating system which is simple, reliable and very compact.

Another object is to provide a silently operating apparatus of the above set forth character.

Still another object lies in the provision of reliable and compact speed reducing means and automatically operating power transmission interrupting means.

Other objects will be in part obvious and in part pointed out hereinafter.
In the accompanying drawings wherein is shown one of the various possible embodiments of the invention—

Figure 1 is a schematic view of a starter and generator.
Fig. 2 is a sectional view of the same, showing the structural details.

The apparatus set forth in the present embodiment includes a motor unit 1, a generator unit 2, power transmitting devices 3 between these units, comprising a system of planetary gearing 4, associated with the shaft 5 of the motor unit, an overrunning clutch 6 associated with the shaft 7 of the generator unit, and suitable power transmitting devices 8 connecting the shaft 7 of the generator with the crank shaft 9 of an internal combustion engine, indicated at 10. A storage battery 11 is arranged in an electrical circuit with the two dynamo-electric units, and by means of a starting switch 12, the motor unit 1 is energized from the storage battery and provides the power for the initial turning or cranking of the engine, after which the starting switch may be opened and the engine, acting under its own power, will drive back to the generator unit 2 and generate current to recharge the storage battery and for lighting purposes. An automatic switch, shown conventionally at 13, is employed for the purpose of cutting the generator into and out of circuit. The motor unit 1 has a series field winding 14 and the generator unit 2 has a series field winding 15 and a shunt field winding 16.

Fig. 2 shows the mechanical structure and it will be noted that both units are conveniently supported and compactly arranged within a housing indicated generally at 17. This housing comprises the caps 18 and 19 which support and incase the commutator ends of the motor 1 and the generator 2 respectively. The field yokes of both units are also partially supported by the caps 18 and 19 and are further supported by the substantially cylindrical body portions 20 and 21 of the casing. These latter portions are inwardly flanged at 22 and 23 respectively to provide supports for the anti-friction bearings 24 and 25. Attached to the bodies 20 and 21 of the housing is a hood 36 composed of several parts suitably connected to incase the power transmitting devices. This hood is shown in the drawings as extending beyond both of the sprockets on the generator shaft, but obviously the same might be carried on to incase the sprocket on the crank shaft of the engine.

The several parts of the housing 17 are connected together to provide a strong and unitary structure and as the dynamo-electric units are arranged one over the other, the device is compact, while, at the same time, a comparatively great speed reduction is obtained by the planetary gearing system which will now be described.

Supported by the body portion 20 and in fixed relation therewith, is an internal gear 27, the teeth of which are adapted to mesh with the teeth of a plurality of planetary gears 28. Each of the planetary gears 28 is loosely mounted on a stud shaft 29 and each stud shaft is in turn fixed to a sprocket 30. The sprocket 30 is journaled in an anti-friction bearing 31 and on the reduced end 32 of the motor shaft 5. A driving pinion 33 is keyed on the end 32 of the shaft and the teeth of this pinion are adapted to mesh with the teeth of the planetary gears 28. As the motor shaft turns, the internal gear 27 being stationary, the planet gears are moved slowly around the motor axis and a substantial speed reduction is obtained between the motor and the sprocket 30. Further reduction is obtained by driving from the sprocket 30 through the silent chain 34 to a large sprocket 35 arranged upon the generator shaft 7. This shaft 7 is supported in suitable anti-friction bearings 36 which are in turn supported by parts of the housing, and keyed or otherwise suitably secured to the shaft 7, is a clutch element 37. This clutch element coöperates with the sprocket 35 through the medium of clutch rollers 38. When the motor 1 furnishes the power, the sprocket 35 is driven at a comparatively low rate of speed and being provided with interior cam faces 39, it wedges the clutch rollers 38 into driving engagement with the clutch element 37 and causes rotation of the generator shaft. A driving sprocket 40 is fixed upon the generator shaft, or parts directly connected therewith, and is connected by a silent chain 41 to a sprocket 42 on the crank shaft 9 of the engine.

In the operation of the device, closure of the starting switch 12 includes the battery 11 in circuit with the motor unit, the latter is energized and drives through the planetary gearing to the sprocket 30. This drives the larger sprocket 35, causes engagement of the different parts of the clutch, rotates the generator shaft at a comparatively low speed, and through the chain and sprocket connections described, turns over the crank shaft of the engine. Compression and ignition will take place and the engine will be actuated by its own power to drive the generator shaft at a much higher speed than that imparted to it by the motor 1. This causes the clutch element 37 to rotate at a greater speed than the sprocket 35 and the clutch rollers 38 will recede from the cam faces 39, thereby interrupting the transmission. When the starting switch 12 is opened, the motor 1 will become idle.

The details of the automatic switch 13 are not a part of the present invention. No regulating means, other than the winding 15, is disclosed, but it will be obvious that the generator 2 may be regulated to confine its output within proper limits.

As many apparently widely different embodiments of the invention could be made without departing from the scope thereof, it is to be understood that all matter contained in the above description or shown in the accompanying drawing, shall be interpreted as illustrative and not in a limiting sense.

What I claim as new and desire to secure by Letters Patent of the United States is:—

1. In an engine starter and generator, in combination, a motor, a generator, power-transmitting means between said motor and said generator including a pinion fixed with the motor shaft, a stationary internal gear arranged to encircle said shaft, a planet gear coöperatively arranged with and between said internal gear and said pinion, a sprocket supported to rotate with said planet gear having its rotative axis out of alinement with the axis of said planet gear, a sprocket loosely mounted on the generator shaft, a clutch element fixed with the generator shaft, coöperative clutch elements adapted to connect the loosely mounted sprocket and the first said clutch element in power transmitting relation, and means on said generator shaft whereby the same may be driven from an internal combustion engine.

2. In an engine starter and generator, in combination, a motor, a generator, power-transmitting means between said motor and said generator including a pinion fixed with the motor shaft, a stationary internal gear arranged to encircle said shaft, a planet gear coöperatively arranged between said internal gear and said pinion, a sprocket supported to rotate with said planet gear having its rotative axis out of alinement with the axis of said planet gear, a sprocket loosely mounted on the generator shaft, a clutch element fixed with the generator shaft, coöperative clutch elements adapted to connect the loosely mounted sprocket and the first said clutch element in power transmitting relation, and means on said generator shaft whereby the same may be driven from an internal combustion engine, said clutch elements being adapted to automatically interrupt the transmisison of power from the generator to the motor upon the development of a certain speed of the generator shaft.

In witness whereof, I have hereunto subscribed my name in the presence of two witnesses.

THOMAS R. DU BOIS.

Witnesses:
JESSE P. HOLTON,
V. E. QUILLINAN.